(12) United States Patent
Hong

(10) Patent No.: US 6,714,272 B2
(45) Date of Patent: Mar. 30, 2004

(54) COLOR LIQUID CRYSTAL DISPLAY DEVICE WITHOUT COLOR FILTER

(75) Inventor: Kyung-Ki Hong, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 124 days.

(21) Appl. No.: 10/014,526

(22) Filed: Dec. 14, 2001

(65) Prior Publication Data

US 2002/0075430 A1 Jun. 20, 2002

(30) Foreign Application Priority Data

Dec. 20, 2000 (KR) .......................... 2000-79354

(51) Int. Cl.[7] ............................................ G02F 1/1337
(52) U.S. Cl. ........................ 349/123; 428/1.25; 349/61
(58) Field of Search ............................. 359/712; 349/61, 349/123, 119; 428/1.25

(56) References Cited

U.S. PATENT DOCUMENTS 6,008,871 A * 12/1999 Okumura ..................... 349/61
6,221,444 B1 * 4/2001 Okada et al. ............... 428/1.25
6,295,109 B1 * 9/2001 Kubo et al. ................. 349/119
6,469,762 B1 * 10/2002 Hong et al. ................. 349/123

* cited by examiner

Primary Examiner—John Niebling
Assistant Examiner—Andre' Stevenson
(74) Attorney, Agent, or Firm—McKenna Long & Aldridge LLP

(57) ABSTRACT

Even though a conventional color LCD device further includes an extra element such as a color filter for color display, the present invention does not need the extra element. The liquid crystal layer is initially aligned parallel to the substrates and then re-aligned by the applied voltage. Transmittance for the specific wavelength is changed according to an angle between the transmission axis of the liquid crystal layer and the light axis of the polarizer. Thus, multiple colors or full color can be realized without the extra element for color display. Therefore, the transmittance of the LCD device is improved and the cost for the LCD device is reduced.

15 Claims, 4 Drawing Sheets

COLOR LIQUID CRYSTAL DISPLAY DEVICE WITHOUT COLOR FILTER

This application claims the benefit of Korean Patent Application No. 2000-79354, filed on Dec. 20, 2000, which is hereby incorporated by reference as if fully set forth herein.

BACKGROUND OF THE INVENTION

1. Field of the Invention

The present invention relates to a liquid crystal display device, and more particularly to a color liquid crystal display device without a color filter.

2. Description of the Related Art

As our information-oriented society rapidly develops, display devices are increasingly developed. The display device processes and displays a great deal of information. A cathode ray tube (CRT) has served as a mainstream of the display device field. However, a flat panel display devices having small size, lightweight, and low power consumption are actively being researched in order to meet the needs of the times. Accordingly, a thin film transistor-liquid crystal display (TFT-LCD) device that has high color quality and small size is developed.

The LCD device uses the optical anisotropy and polarization properties of liquid crystal molecules to produce an image. Liquid crystal molecules have a definite orientational alignment as a result of their long, thin shapes. The orientational alignment can be controlled by an applied electric field. In other words, as an applied electric field changes, so does the alignment of the liquid crystal molecules. Due to the optical anisotropy, the refraction of incident light depends on the orientational alignment of the liquid crystal molecules. Thus, by properly controlling the applied electric field a desired image can be produced.

FIG. 1 is a schematic perspective view of a conventional TFT-LCD device.

The TFT-LCD device includes upper and lower substrates 5 and 22, and a liquid crystal layer 14 interposed therebetween. The upper and lower substrates 5 and 22 are sometimes referred to as a color filter substrate and an array substrate, respectively. On a surface facing the lower substrate 22, the upper substrate 5 includes a black matrix 6 and a color filter layer 7. The color filter layer 7 includes a matrix array of red (R), green (G), and blue (B) sub-color filters that are formed such that each sub-color filter is bordered by the black matrix 6. The upper substrate 5 also includes a transparent common electrode 18 over the color filter layer 7 and the black matrix 6. On a surface facing the upper substrate 5, the lower substrate 22 includes an array of thin film transistors (TFTs) shown as a "T" that act as switching devices. The array of thin film transistors is formed to correspond with the matrix of sub-color filters. A plurality of crossing gate and data lines 13 and 15 are positioned such that a TFT is located near each crossing of the gate and data lines 13 and 15. The lower substrate 22 also includes a plurality of pixel electrodes 17, which are made of a transparent material such as indium-tin-oxide (ITO) or indium-zinc-oxide (IZO). Each pixel electrode is disposed in a corresponding area defined between the gate and data lines 13 and 15 and often referred to as pixel regions P.

In LCD devices an electro optic effect of the liquid crystal material is a phenomenon where an electro optic modulation occurs by the change of the optical property of the liquid crystal material, that is, an alignment state of the liquid crystal material turns to another alignment state by an applied electric field.

The LCD devices utilize the electro-optic effect of the liquid crystal material and can be divided into 4 display types. The following is description of the LC operating modes using various electro-optical effects, including a twisted nematic (TN) mode, a guest host (GH) mode, electrically controlled birefringence (ECB) effect and ferro-electric liquid crystal (FLC) mode. The display type can be selected and used according to a design characteristic of the liquid crystal panel.

Recently, various methods to express colors without the color filter by using wavelength property of light due to the birefringence of the liquid crystal material have been suggested. Among them are a method using the ECB effect and will be explained with the color TFT-LCD device using the ECB mode. In the ECB mode LCD device, the pretilt angle is nearly 90° and the liquid crystal molecules are aligned parallel to the substrate by the applied voltage such that a transmittance of light can be controlled.

FIGS. 2A and 2B are cross-sectional views of a conventional ECB mode reflective LCD device and shows the operation of liquid crystal molecules when an applied voltage is off or on, respectively.

As shown in FIG. 2A, upper and lower substrates 31 and 33 are spaced apart from each other with a specific gap (d) and liquid crystal molecules 35 are interposed therebetween. An upper polarization plate 39 is formed on an outer surface of the upper substrate 31 and as a result of the upper polarization plate only light parallel to the transmittance axis of the polarization plate can be emitted to the exterior of the display. The liquid crystal molecules 35 are aligned with an arbitrary pretilt angle $\theta_p$ between about 0° and 90°, preferably an angle between 60° and 85° considering a property of viewing angle and gray scale inversion. To acquire the desired pretilt angle, orientation films 37 and 38 are formed on each facing surface of the upper and lower substrates 31 and 33 and a rubbing process of the orientation films 37 and 38 is performed.

As shown in FIG. 2B, when a voltage is applied to the upper and lower substrates 31 and 33, the liquid crystal molecules 35 are aligned with another angle $\theta_m$. The light is polarized as it passes through the polarization plate 39, the upper substrate 31, the liquid crystal molecules 35 and a reflection plate 41. The transmittance of the light changes according to the angle between the light axis of the liquid crystal molecules 35 and the transmittance axis of the polarization plate 39 when the voltage is applied to the LCD device.

The transmittance of the ECB mode LCD device is dependent on the wavelength in contrast with the transmittance of the TN mode LCD device.

An equation for the transmittance (T) of the ECB mode reflective LCD devices is as follows. The angle between the light axis of the liquid crystal molecules and the transmission axis of the polarization plate is assumed to be 45° and the LCD device includes the polarization plate, the liquid crystal layer and the reflection plate from the top.

$$T = \cos^2(2\pi d \cdot \Delta n(\lambda)/\lambda)/2 \quad \text{(Equation 1)}$$

where d is a cell gap between the upper and lower substrates 31 and 33, $\Delta n$ is a refractive index anisotropy, $\lambda$ is a wavelength and $d \cdot \Delta n$ is a retardation. As shown from the equation 1 the transmittance is a function of retardation ($d \cdot \Delta n$) for a specific wavelength ($\lambda$) of the incident light.

FIG. 3 shows the transmittances of red (R), green (G) and blue (B) light 43, 45 and 47, respectively, for the conventional ECB mode reflective LCD device as a function of the effective retardation (d·Δn$_{eff}$), which can be calculated by using the equation (1). The colors of transmitted light continuously change in a series of white, black, blue, green and pink according to the effective retardation (d·Δn$_{eff}$) by the applied voltage.

However, in the conventional ECB mode LCD device, since the viewing angle is too narrow, the color is different according to the viewing direction. Moreover, since the transmittance curves of the colors have the peaks of the same height, the number of the expressible colors is limited.

SUMMARY OF THE INVENTION

Accordingly, the present invention is directed to a color liquid crystal display device and manufacturing method thereof that substantially obviates one or more of problems due to limitations and disadvantages of the related art.

An advantage of the present invention is to provide a color liquid crystal display device and a manufacturing method thereof that can realize multiple colors or full color without the use of a color filter.

Another advantage of the present invention is to provide a color liquid crystal display device that has a wide viewing angle.

Additional features and advantages of the invention will be set forth in the description that follows, and in part will be apparent from the description, or may be learned by practice of the invention. These advantages and other advantages of the invention will be realized and attained by the structure particularly pointed out in the written description and claims hereof as well as the appended drawings.

To achieve these and other advantages and in accordance with the purpose of the present invention, as embodied and broadly described, a color liquid crystal display device includes upper and lower substrates facing and spaced apart from each other, a liquid crystal layer interposed between the upper and lower substrates and initially aligned parallel to the substrates and upper and lower polarizers respectively disposed on an outer surfaces of the upper and lower substrates, wherein the liquid crystal layer is re-aligned by an applied voltage and a transmittance of the liquid crystal layer for a specific wavelength is changed according to a change of an angle between an light axis of the liquid crystal layer and a transmission axis of the polarizers so that the device can display multiple colors.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

The characteristic of the present invention is to realize multiple colors by changing the alignment direction of the liquid crystal, which is vertically aligned at first, according to an applied voltage.

Figure 1:
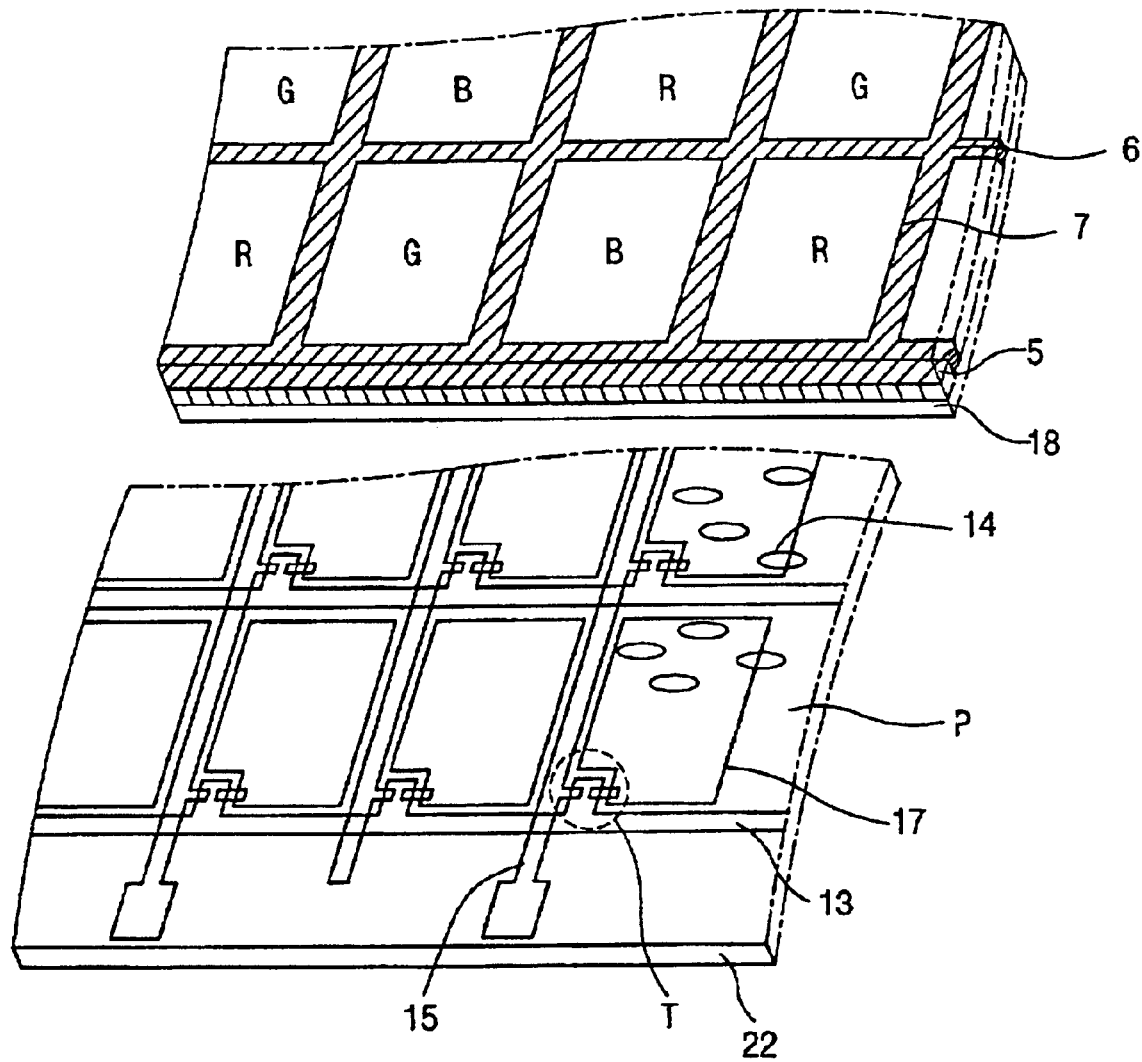
FIG. 1 is a schematic perspective view of a conventional thin film transistor liquid crystal display device.
Figure 2A:
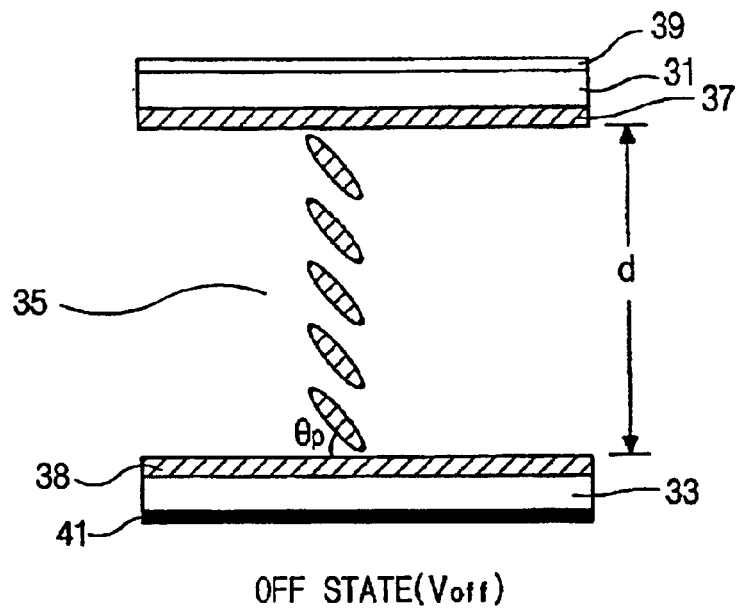
FIGS. 2A and 2B are schematic cross-sectional views of a conventional electrically controlled bireflingence mode reflective liquid crystal display device.
Figure 2B:
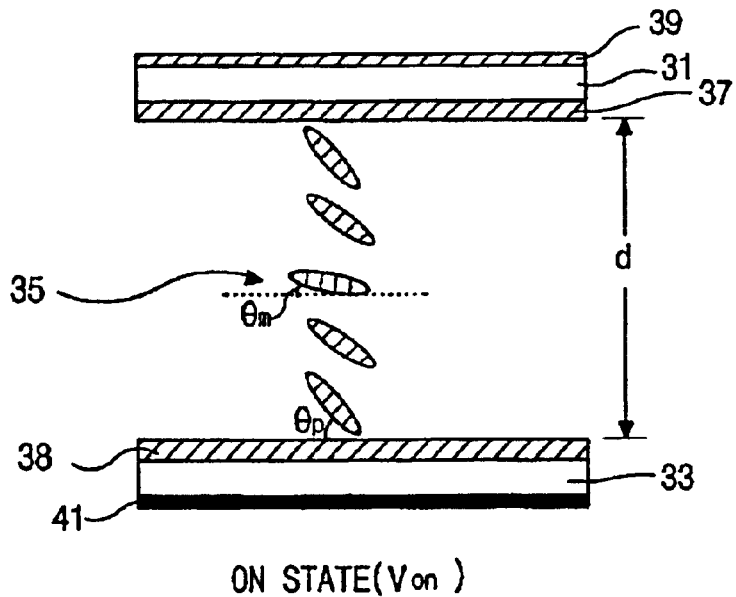
Figure 3:
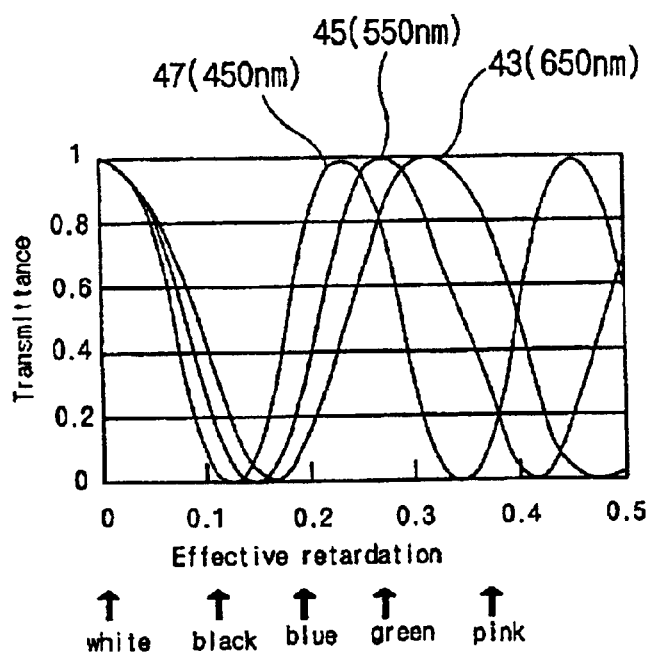
FIG. 3 is a schematic graph of transmittances for three wavelengths as a function of an effective retardation in a conventional electrically controlled birefringence mode reflective liquid crystal display device.
Figure 4:
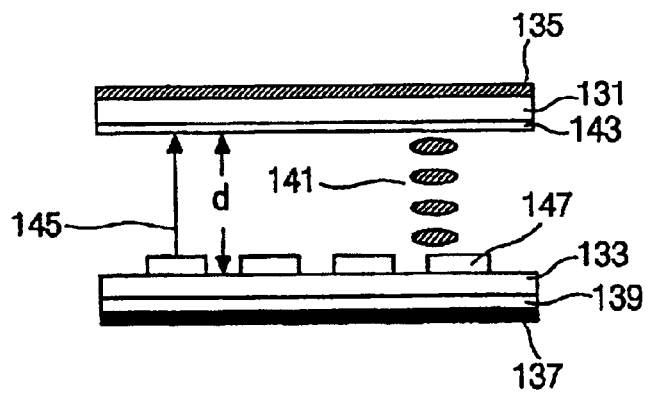
FIG. 4 is a schematic cross-sectional view of a general mode reflective liquid crystal display device according to a first embodiment of the present invention.

FIG. 4 is a schematic cross-sectional view of a general mode, utilizing vertical electric field, reflective liquid crystal display device according to a first embodiment of the present invention.

The reflective LCD device includes upper and lower substrates 131 and 133, and a liquid crystal layer 141 interposed therebetween. A polarizer 135 that transmits only one polarized light of diversely polarized lights is disposed on an outer surface of the upper substrate 131, and a reflection plate 137 that reflects incident light is disposed on an outer surface of the lower substrate 133. The reflection plate 137 is made of an opaque metal, preferably, a metal of aluminum or aluminum-alloy that has a high reflectance. Furthermore, a phase compensation plate 139 that changes a phase of the incident light is interposed between the reflection plate 137 and the lower substrate 133. Therefore, the liquid crystal layer 141 is aligned by an electric field 145 between a transparent common electrode 143 formed on an inner surface of the upper substrate 131 and a pixel electrode 147 formed on an inner surface of the lower substrate 133.

The liquid crystal layer is initially aligned with a pretilt angle of nearly 0° with respect to the substrates and the alignment direction is changed with a specific angle with respect to the substrates according to the applied voltage. Ferroelectric liquid crystal (FLC) material, preferably, anti-ferroelectric material (AFLC) can be used so that the viewing angle characteristic of the reflective LCD device can be improved.

Figure 5:
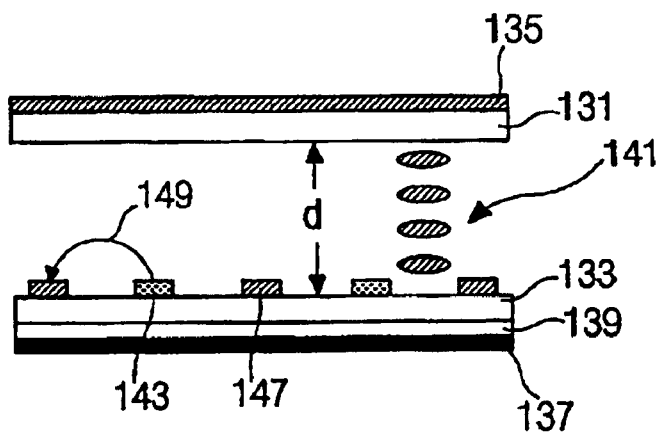
FIG. 5 is a schematic cross-sectional view of an in plane switching reflective liquid crystal display device according to a second embodiment of the present invention.

FIG. 5 is a schematic cross-sectional view of an in plane (IPS) switching reflective liquid crystal display device according to a second embodiment of the present invention.

The difference between the general mode LCD device of FIG. 4 and the IPS LCD device of FIG. 5 is a position of the common electrode. In the IPS LCD device, since a common electrode 143 and a pixel electrode 147 are formed on the lower substrate 133, a liquid crystal layer 141 is aligned by a parallel electric field generated between the common and pixel electrodes 143 and 147.

An equation for the transmittance (T) of the reflective LCD devices according to the first or second embodiments of the present invention is as follows. Here, the liquid crystal layer is aligned horizontal to the substrates at first, for example, the pretilt angle is nearly 0°.

$$T=\sin^2(2\alpha)\cdot\sin^2(2\pi d\cdot\Delta n(\lambda)/\lambda)/2 \quad \text{(Equation 2)}$$

where $\alpha$ is an angle between the light axis of the liquid crystal molecules and the transmission axis of the polarization plate in case of viewing the panel at top, d is a cell gap between the upper and lower substrates 131 and 133, $\Delta n$ is a refractive index anisotropy, $\lambda$ is a wavelength and d·$\Delta n$ is a retardation. The transmittance is a function of the angle ($\alpha$) and the retardation (d·$\Delta n$) for a specific wavelength ($\lambda$) of the incident light. To realize the multiple colors or full color, the cell gap (d) should be large enough, preferably, a value in the range between approximately 5 μm to 7.5 μm. Therefore, since the light path of the reflective LCD device is twice as long as the light path of the transmissive LCD device, the present invention can be more advantageously applied to the reflective LCD device than to the transmissive LCD device.

Figure 6:
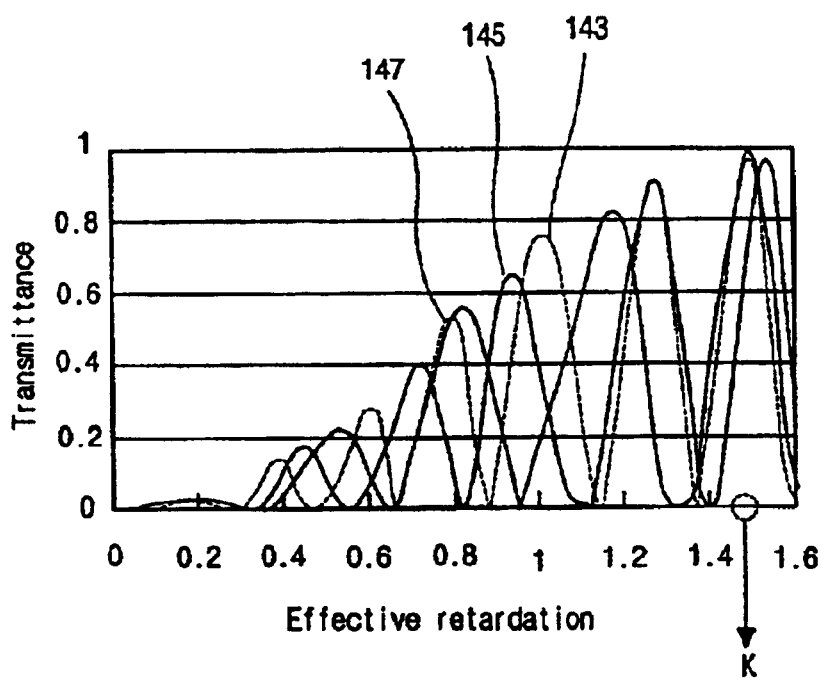
FIG. 6 is a schematic graph of transmittances for three wavelengths according to an effective retardation in a reflective liquid crystal display device according to the first or second embodiment of the present invention.

FIG. 6 is a schematic graph of transmittances for three wavelengths, for example, R, G and B as a function of an effective retardation (d·$\Delta n_{eff}$) in a reflective LCD device according to the first or second embodiments of the present invention, where the effective retardation (d·$\Delta n_{eff}$) is changed according to the applied voltage.

As shown, the transmittances 143, 145 and 147 for three wavelengths R, G and B, respectively, fluctuates according to the effective retardation (d·$\Delta n_{eff}$). The larger the effective retardation (d·$\Delta n_{eff}$), the higher the peak of the transmittance. Moreover, at the point (K), where the effective retardation (d·$\Delta n_{eff}$) is about 1.5 μm, each transmittance for three wavelengths has its maximum value so that the white color can be realized. Therefore, the normally white and normally black modes can be realized. Since the transmittance (T) relates to the brightness of the LCD device and the color of the light mixed for three wavelengths is changed according to each brightness, the multiple colors or full color can be realized by the combination of three lights having three wavelengths according to the effective retardation. Accordingly, the extra element for color display such as color filter is not necessary so that the transmittance can be increased by about 300% and the cost can be reduced. Moreover, since the liquid crystal layer is vertically aligned at first, the viewing angle of the LCD device according to the present invention is wider than the viewing angle of the LCD device using the TN liquid crystal material.

Consequently, in one embodiment according to the present invention, the pretilt angle is nearly 0°, for example, the liquid crystal molecules are aligned horizontal to the substrates at first. If a voltage is applied to the liquid crystal layer, the liquid crystal molecules rotate and have different angle between the light axis of the liquid crystal molecules and the transmission axis of the polarization plate. Therefore, the transmittances of the incident light with respect to the wavelengths have different values and the multiple colors or full color can be realized with a wide viewing angle.

It will be apparent to those skilled in the art that various modifications and variation can be made in the method of manufacturing a flat pane display device of the present invention without departing from the spirit or scope of the invention. Thus, it is intended that the present invention cover the modifications and variations of this invention provided they come within the scope of the appended claims and their equivalents.

What is claimed is:

1. A color liquid crystal display device, comprising:

upper and lower substrates facing and spaced apart from each other;

a liquid crystal layer interposed between the upper and lower substrates and wherein the liquid crystal layer is initially aligned parallel to the substrates;

a polarizer disposed on an outer surface of the upper substrate; and a reflection plate disposed on an outer surface of the lower substrate;

wherein the liquid crystal layer is re-aligned by an applied voltage and a transmittance of the liquid crystal layer for a specific wavelength is changed according to a change of an angle between a light axis of the liquid crystal layer and a transmission axis of the polarizer so that the device can display multiple colors.

2. The color liquid crystal display device according to claim 1, wherein a gap between the upper and lower substrates has a value in a range between approximately 5 μm to 7.5 μm.

3. The color liquid crystal display device according to claim 1, further comprising a phase compensation plate interposed between the lower substrate and the reflection plate.

4. The color liquid crystal display device according to claim 1, wherein the liquid crystal layer includes one of a ferroelectric liquid crystal material and an antiferroelectric liquid crystal material.

5. The color liquid crystal display device according to claim 1, wherein the liquid crystal layer is aligned along an electric field parallel to the substrates.

6. The color liquid crystal display device according to claim 1, wherein the reflective plate is an opaque metal.

7. The color liquid crystal display device according to claim 1, wherein the reflective plate is aluminum.

8. A liquid crystal display device, comprising:

upper and lower substrates parallel to each other and separated by a predetermined distance, the upper and lower substrates having inner and outer surfaces, respectively, the respective inner surfaces facing each other;

a pixel electrode over an inner surface of the lower substrate;

a common electrode over the inner surface of one of the upper and lower substrates;

a polarizer on the outer surface of the upper substrate, the polarizer having a transmission axis; and a liquid crystal between the inner surfaces of the upper and lower substrates, the liquid crystal having a light axis that corresponds to a voltage between the common and pixel electrodes;

wherein an angle between the light axis and the transmission axis corresponds to voltage between the common and pixel electrodes and is tunable for transmission of a specific wavelength of light.

9. The liquid crystal display device of claim 8, further comprising:

a reflection plate on the outer surface of the lower substrate.

10. The liquid crystal display device of claim 8, wherein the common electrode is transparent and is on the inner surface of the upper substrate.

11. The liquid crystal display device of claim 8, wherein the common electrode is transparent and is on the inner surface of the lower substrate.

12. The liquid crystal display device of claim 8, wherein the liquid crystal has a pretilt angle of approximately 0° when there is no electric field between the common and pixel electrodes and has a predetermined angle corresponding to an applied voltage between the common and pixel electrodes when a voltage is applied between the common and pixel electrodes.

13. The liquid crystal display device of claim 8, wherein the predetermined distance is in the range of approximately 5 µm to approximately 7.5 µm.

14. The liquid crystal display device of claim 8, wherein the liquid crystal is a ferroelectric liquid crystal.

15. The liquid crystal display device of claim 8, wherein the liquid crystal is an antiferroelectric liquid crystal.

* * * * *